May 6, 1947.  W. H. FAUSZ  2,420,037

QUICK RELEASE MEANS FOR PARACHUTE HARNESS

Filed Nov. 30, 1943

WILLIAM H. FAUSZ,
INVENTOR.

BY Allen & Allen
Attorneys.

Patented May 6, 1947

2,420,037

UNITED STATES PATENT OFFICE 2,420,037

QUICK RELEASE MEANS FOR PARACHUTE HARNESS

William H. Fausz, Newport, Ky.

Application November 30, 1943, Serial No. 512,368

8 Claims. (244—151)

My invention relates to a means which will separate a parachute harness at a sufficient number of points to enable the wearer of the harness to divest himself of it instantly. The parachutist should be able to rid himself of the harness and parachute as soon as his jump is terminated. If he lands in the water he may find himself unable to swim unless he can get rid of these elements. If he lands on the earth, a wind is likely to fill his parachute and cause it to drag him along the ground so that he is likely to become injured. In military operations the necessity of immediate freedom for activity furnishes another reason for quick release. The need has been recognized, and certain quick release mechanisms have been suggested; but these have been complicated mechanically and in some instances inherently dangerous so that, so far as I am aware, they have not come into commercial or military use.

The usual parachute harness is made separable at three points, where it is held together by harness hooks engaging rings or the like. This means that three fastenings must be undone by the parachutist, which takes time; and the nature of the fastenings is such as to require both hands and the exertion of considerable pressure to cause harness elements to approach each other.

It is an object of my invention to provide a quick release means which is not liable to accidental operation but is capable when voluntarily actuated by the parachutist to release all fastenings at once in a simple and positive manner.

It is an object of my invention to provide a means of that character, which can be applied to standard harness constructions.

It is an object of my invention to provide a quick release mechanism which is inexpensive to construct and simple as to its parts; which is safe in that it cannot be released by external elements or accident, and which is not bulky and does not tend toward rigidity in the harness or a lack of comfort therein.

These and other objects of my invention which will be set forth hereinafter or will be apparent to one skilled in the art upon reading these specifications, I accomplish by that certain construction and arrangement of parts of which I shall now describe an exemplary embodiment, with reference to the drawings which form a part hereof.

Figure 1:
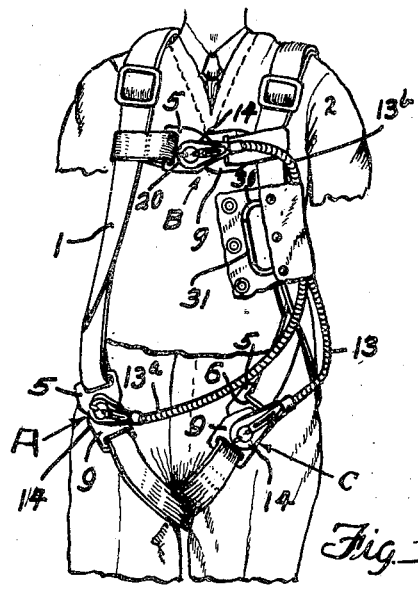
Figure 1 is a perspective view of a harness embodying my invention in place on the person of the user.

As has been indicated, my release means is applicable to the standard parachute harness; but it is not confined thereto. It will be apparent as my description proceeds that my means may be adapted to any style of harness, and in particular to harnesses which are designed to be separable at fewer points or at more points than the exemplary embodiments. In Figure 1 I have shown a harness 1 in place on the person 2 of a wearer. The details of the harness will not be described since they form no limitation on my invention. The particular harness shown is a standard harness separable at three points indicated respectively at A, B and C. The parachute and parachute pack have not themselves been shown. They are attachable to the harness in any of the ways and positions current in the art. When positioned on the chest of the user, the parachute and parachute pack may cover portions of my structure but this cannot in any way affect its operation; and the operating handle will still be accessible to the user who can reach beneath the pack.

Figure 3:
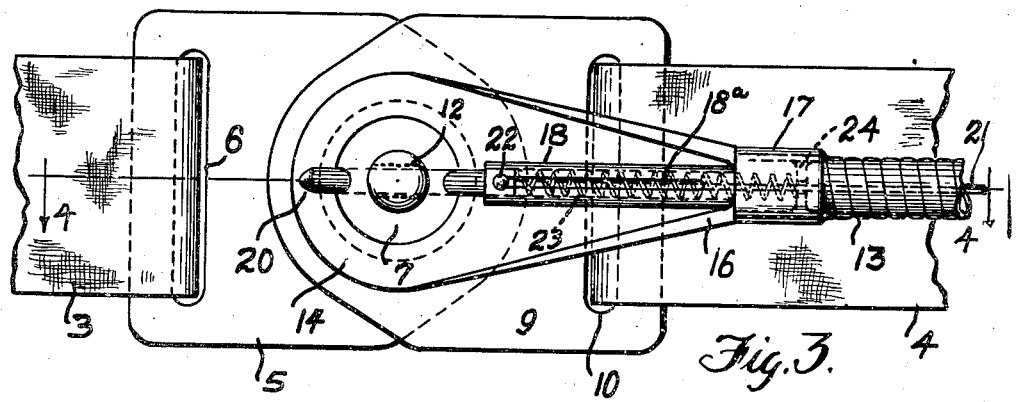
Figure 3 is a plan view of one of the releasable means.
Figure 4:
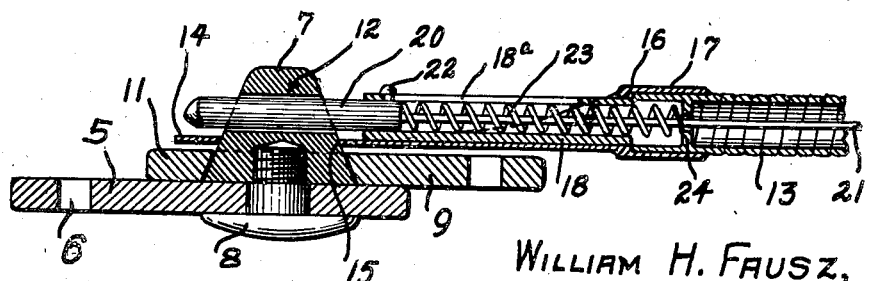
Figure 4 is a longitudinal section thereof related to the section line 4—4 of Figure 3.

To the ends or loops of the webbing straps at the positions of separability I attach structures particularly illustrated in Figures 3 and 4. In Figure 3 strap loops are shown at 3 and 4. To the loop 3 there is attached a metal plate 5 having a slot 6 through which the loop can pass, adjacent one of its ends. The other end is tapered or rounded and is provided with a stud 7. The stud may be fastened in place by means of a screw 8 passing through a perforation such that the stud 7 is rotatable on the plate 5.

The other plate is indicated at 9 having adjacent one end a slot 10 to accept the other loop of webbing 4. The plate 9 is perforated as at 11 so that it may be slipped over the stud 7; and the stud itself is preferably made tapered as shown so that the plate 9 can readily free itself from plate 5. The stud 7 is also transversely perforated as at 12 to receive a pin which will prevent separation of the plates by holding plate 9 on the stud.

There will be a similar construction at each of the points at which the harness is designed to be separable, and operating means for the several pins will be brought out to a central actuation point, as will hereinafter be described. The operating wires pass through sheaths which act to prevent an accidental pull on the wires, the sheaths being anchored both at the position of the operating handle and at the separable elements.

The sheaths are preferably flexible, spirally wound metallic tubes 13, 13a and 13b. At its outer end each of these sheaths is anchored to a guard member 14 which is in the form of a metallic sheet or plate. The guard near one of its ends is perforated as at 15 to pass over the stud. The other end of the guard is preferably rolled or bent up as at 16 to form a ferrule-shaped part attachable to the sheath 13. A thimble 17, of such size as to slip over the sheath 13 and the ferrule part of the guard is preferably provided; and, after the assembly of certain other parts which will hereinafter be mentioned the ferrule, the thimble and the sheath may be welded, brazed or otherwise firmly joined together.

A tubular member 18 is engaged in the ferrule and projects toward the other end of the guard member. Within this tube slides the pin 20 which passes through the perforation 12 in the conical stud 7 and holds plates 5 and 9 together. The pin 20 is attached to an operating wire or rod 21 which extends through the sheath. The tube 18 is preferably slotted as at 18a to receive a projection 22 on the pin 20, so as to limit the motion of the pin within the tube. Preferably also the tube contains a coiled compression spring 23 acting to drive the pin outwardly toward the end of tube 18. The spring abuts against the pin 20 at one end and at its other end against a partition member 24, perforated for the passage of wire 21 and brazed or otherwise fastened inside the sheath or the thimble or the ferrule or the tube. It will be understood that modifications in the way in which the sheath is joined to the guard may be made without departing from the spirit of my invention. In the exemplary form the tube 18 may be welded or brazed to the ferrule of the guard.

The guard serves as the outer anchor for the sheath which is ataached to it. If desired, the metal at the outer end of the guard may be turned upwardly about the stud to prevent accidental contact of external elements with the pin 20.

Figure 2:
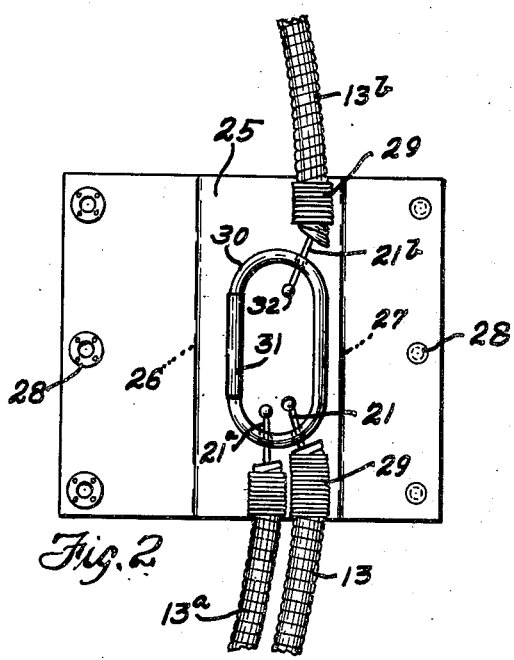
Figure 2 is a plan view of a release handle and appurtenances.

Similar constructions to those just described, and illustrated in Figures 3 and 4 will be located at all points of separability of the harness; and the sheaths will be brought to a central operating point. Here I provide a pocket or other guard for the operating handle, the pocket being preferably firmly attached to a harness element. I have illustrated an element 25, which may be of strong cloth foldable along lines 26 and 27 to a tubular form, its edges being provided with snap fasteners 28 or the like. The inner ends of the sheaths 13, 13a and 13b are firmly anchored to the element 25 in any suitable fashion. It may be done by strong sewing as indicated at 29 or otherwise as desired. The purpose of anchoring the sheaths at both ends is to prevent any pull accidentally exerted upon them from being transmitted to the operating wires. These wires 21, 21a, and 21b are thus brought to a central point and are there provided with an operating handle which, being actuated, will pull on all wires at once. A suitable form of operating handle is indicated at 30 and is made of a piece of tubing bent to generally ring form with its ends inserted and welded or brazed in another length of somewhat larger tubing 31. A mode of attaching the wires in a flexible fashion to the handle 30 is illustrated in Figure 2, where the wires pass through perforations in the handle and are provided at their ends with enlargements 32 which will not pass through the holes.

The member 25 will normally be folded over the operating handle and the ends of the sheaths and held by its snap fasteners. It can, however, be easily opened by the parachutist during his jump. He can grasp the handle 30 in preparation, and at the conclusion of his jump a slight pull thereon will result in the simultaneous withdrawal of the pins 20 from the studs 7 at each of the separable points of the harness. Thereupon each guard will come off its stud and each plate 9 will likewise separate from its cooperating plate 5, the tapered form of the studs 7 facilitating this action, as will now be clear.

The structure is not susceptible to accidental release; pulls exerted upon the sheaths will not produce release; and because the studs 7 are rotatably mounted upon the plates 5 the guards 14, prior to harness release, can turn with respect to the plates, as may be required by movements of the wearer. The flexible character of the sheaths likewise permits such movement.

Modifications may be made in my invention without departing from the spirit of it. Having thus described my invention in an exemplary embodiment, what I claim as new and desire to secure by Letters Patent is:

1. In combination with parachute harness or the like having at least one point of separation, plates attached to harness elements and arranged to be detachably secured together, one of said plates having a stud, the other of said plates having a perforation to admit said stub, said stud having a transverse perforation to admit a pin to hold said parts in assembly, a flexible operating element for said pin, a flexible sheath surrounding said operating element, said sheath and operating element extending to a point of convenient access to the wearer of the harness, the operating element there having a handle, and means for anchoring the sheath at both ends so that tension on the sheath will not produce movement of the pin, the said anchoring means at one end of the sheath including a plate-like guard perforated to pass over the stud and lie under and beyond the pin, and means attaching said guard to said sheath.

2. The structure claimed in claim 1 including means on said guard for guiding the movement of said pin.

3. The structure claimed in claim 1 including means on said guard for guiding the movement of said pin, and including means rotatably mounting said stud upon the plate which bears it so that the other plate and said guard can move independently with respect to the plate bearing the stud, said stud being frusto-conical whereby to facilitate the disengagement of the said guard and the perforated plate therefrom.

4. In a parachute harness or the like having a plurality of points of separability, release means located at said several points, a flexible operating element extending from each release means to a point of convenient access to the operator, a flexible sheath surrounding each operating means and extending from the release point to said access point, means for anchoring each sheath at its release point, a guard at the access point, each sheath being attached to said guard, the said several operating means being attached at said access point to a common operating handle, and said guard means being capable of completely covering and protecting said operating handle against accidental movement.

5. In combination with parachute harness having a plurality of points of separability, a pair of plates at each such point to which harness parts are respectively attached, one of said plates bearing a frustro-conical stud, the other of said plates being perforated to pass over said stud, a guard at each of said points of separability including a plate-like member perforated to pass over said stud, a pin at each of said points of separability passing through a transverse aperture in said stud whereby to hold the said parts in assembly, a flexible operating element attached to each of said pins and extending therefrom to a point of convenient access to an operator, a flexible sheath surrounding each of said operating elements, each of said flexible sheaths being attached at one of its ends to one of said guards, a pocket-forming element at said position of access, each of said sheaths being attached at its other end to said pocket-forming element, an operating handle within said pocket-forming element, each of said operating elements being attached thereto, said pocket-forming element being attached to and supported by said harness and being capable of completely covering and protecting said operating handle.

6. The structure claimed in claim 5 wherein said operating handle is a ring-shaped element, wherein said operating elements pass through perforations in the ring-shaped element and are provided with heads incapable of passing through said perforations, the construction being such that a pull on said operating handle will simultaneously actuate all of said operating elements.

7. In a device of the class described, and having a pair of plates attached to separable parts of a harness, one of said plates bearing a frustro-conical stud and the other being perforated to pass over said stud, quick release mechanism comprising a guard of plate-like form, one end of which is perforated to pass over said stud and the other end of which is formed to coact with a tubular metal flexible sheath, means attaching the sheath to said guard, a tubular element on said guard extending toward the perforation therein, a pin slidable in said tubular element and adapted to pass through a transverse perforation in said stud to hold said plates and guard in assembly, a wire-like operating element attached to said pin, passing through said tube and said sheath, a spring in said tube engaging against said pin at one end, a partition adjacent an end of said tube and engaging the other end of said spring, said partition being perforated for the passage of said wire-like operating element.

8. In a device of the class described, and having a pair of plates attached to separable parts of a harness, one of said plates bearing a frustro-conical stud and the other being perforated to pass over said stud, quick release mechanism comprising a guard of plate-like form, one end of which is perforated to pass over said stud and the other end of which is formed to coact with a tubular metal flexible sheath, means attaching the sheath to said guard, a tubular element on said guard extending toward the perforation therein, a pin slidable in said tubular element and adapted to pass through a transverse perforation in said stud to hold said plates and guard in assembly, a wire-like operating element attached to said pin, passing through said tube and said sheath, a spring in said tube engaging against said pin at one end, a partition adjacent an end of said tube and engaging the other end of said spring, said partition being perforated for the passage of said wire-like operating element, means anchoring the other end of said sheath at a remote part of said harness, the wire-like operating element being there provided with a handle, and means at said part completely to cover said handle and prevent accidental movement thereof.

WILLIAM H. FAUSZ.

REFERENCES CITED

The following references are of record in the file of this patent:

UNITED STATES PATENTS

| Number | Name | Date |
| --- | --- | --- |
| 1,350,314 | Katzmarek | Aug. 24, 1920 |
| 1,050,874 | Twombly | Jan. 21, 1913 |
| 2,100,693 | Irvin | Nov. 30, 1937 |
| 2,108,491 | Kuhlemann | Feb. 15, 1938 |
| 1,899,713 | Nichols | Feb. 28, 1933 |
| 1,838,289 | Smith | Dec. 29, 1931 |
| 2,056,549 | Weinberg | Oct. 6, 1936 |

FOREIGN PATENTS

| Number | Country | Date |
| --- | --- | --- |
| 400,385 | British | Oct. 26, 1933 |
| 698,579 | French | Nov. 28, 1930 |